United States Patent Office 2,767,943
Patented Oct. 23, 1956

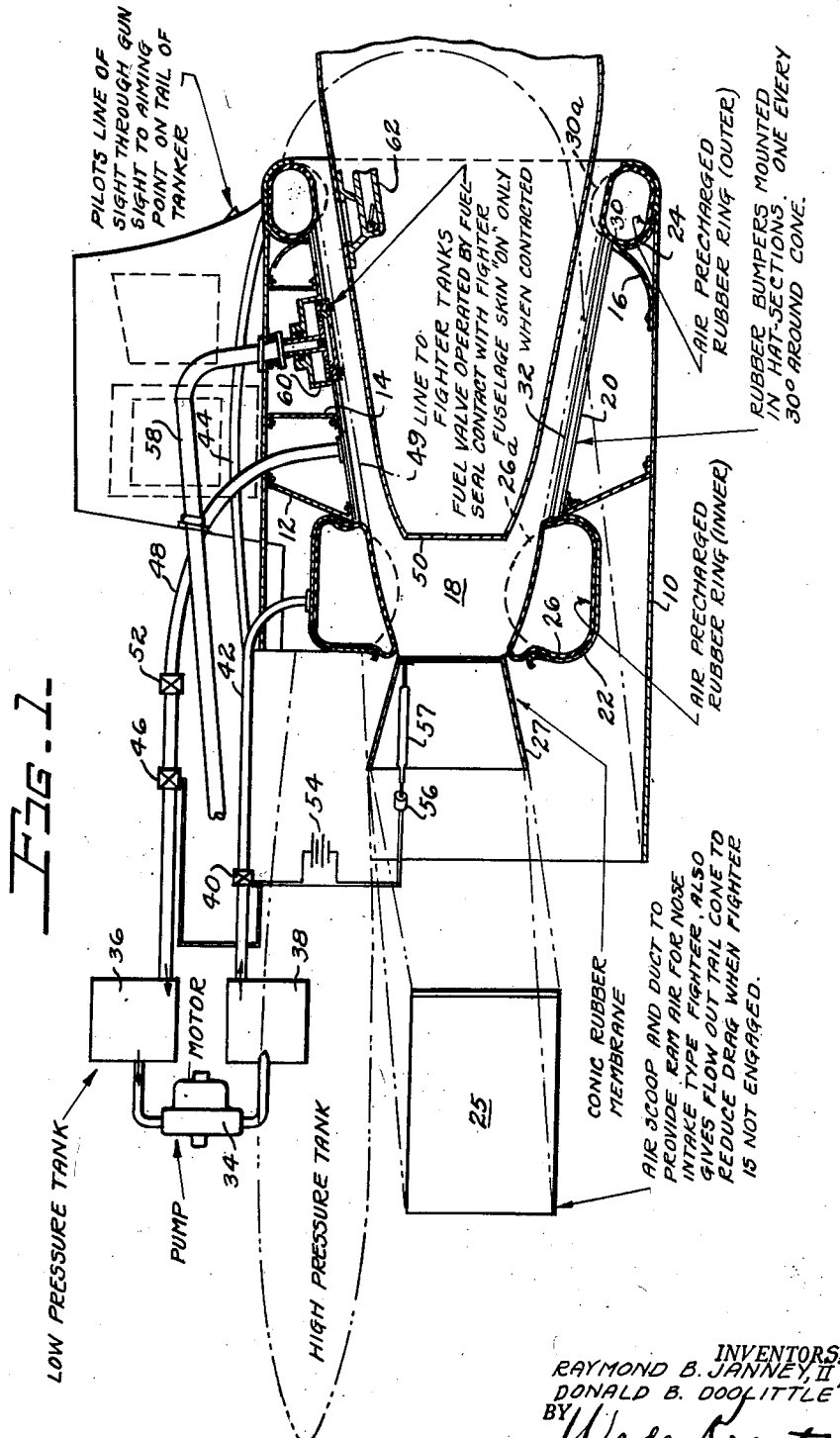

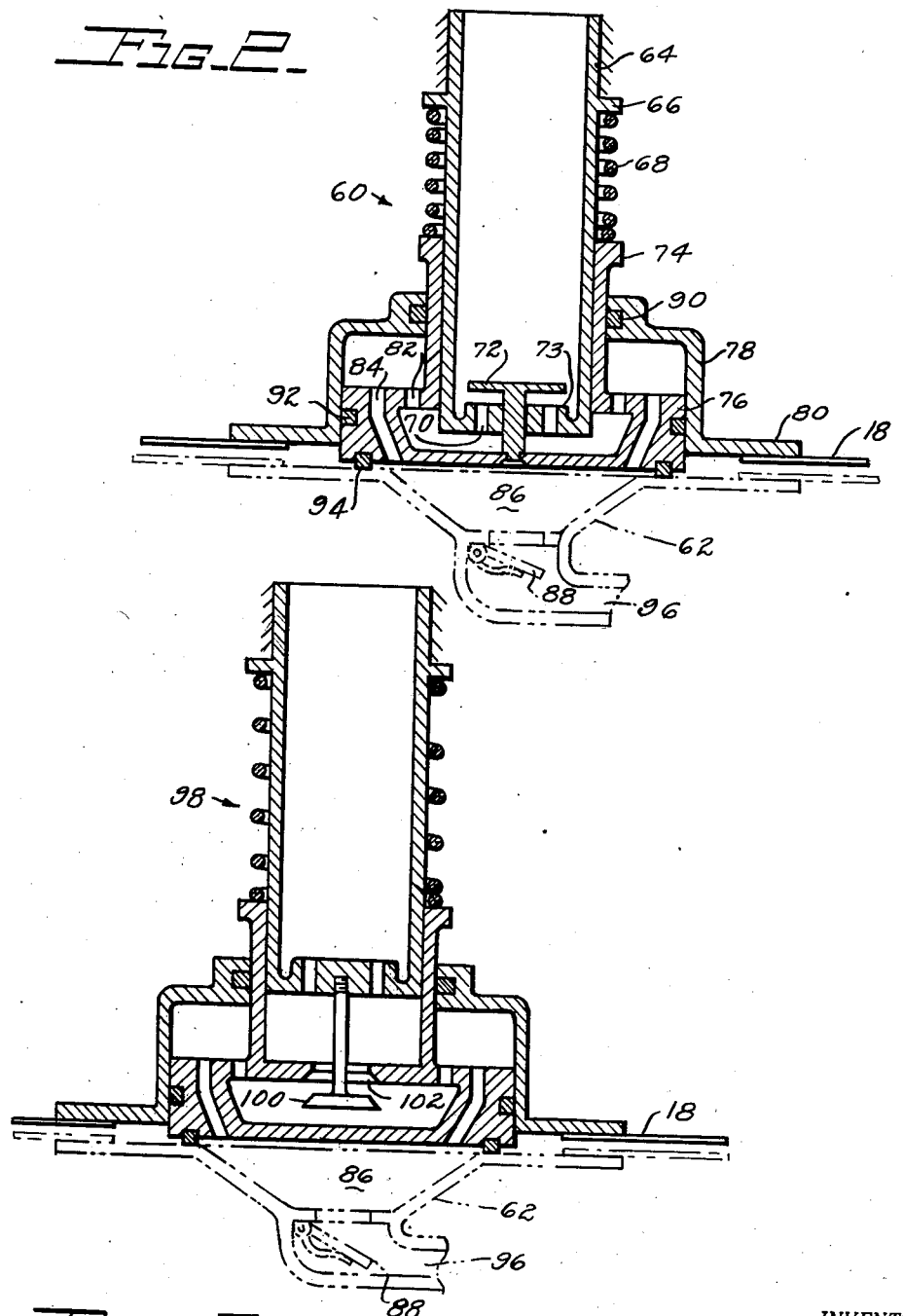

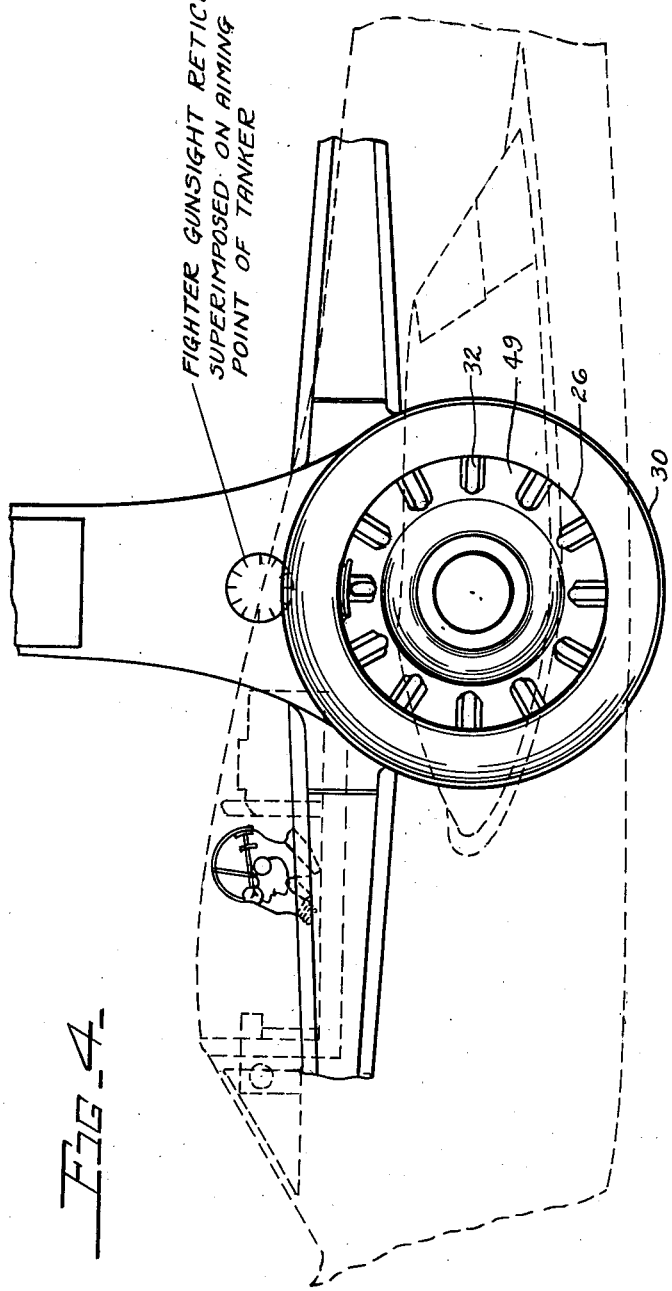

2,767,943

AIR TO AIR REFUELING OF FIGHTER AIRCRAFT

Raymond B. Janney II and Donald B. Doolittle, Wilmington, Del., assignors to the United States of America as represented by the Secretary of the Air Force Application October 15, 1951, Serial No. 251,317

10 Claims. (Cl. 244—135)

This invention relates to in-flight refueling of aircraft and more particularly to the refueling of high speed jet fighter planes and the equipment for carrying the refueling operation into effect.

The system which is the subject of this invention is of that type which involves a fluid flow connection of the nose of a fighter plane to the tail of a tanker plane, a hollow frusto-conical socket structure, which may be called the tanker cone, in the tail of the tanker being enterable by a hollow frusto-conical nose extension on the front of the fighter.

Means are provided for making a tight seal between the tanker cone and fighter nose coincident with the making of physical connection of the two aircraft. This sealing means consists of an inner and an outer inflatable rubber toroid carried in the inner and outer ends respectively of the frusto-conical tanker cone. While acting as bumpers, these rubber toroids also provide a seal at the end cross sections of the tanker cone with the fighter nose extension when the fighter nose is fully entered in the tanker cone. These toroids are partially inflated before the fighter nose is entered into the tanker cone and normally project inwardly from the cone wall until the fighter nose extension is fully entered.

Means are provided to further inflate the toroids after the fighter nose extension is entered, whereby the space between the toroids is sealed off from the atmosphere.

Pressure means is provided to maintain a pressure differential of about 2 p. s. i. between the atmosphere and that space which is included between the toroids, the skin of the fighter nose extension and the inside of the tanker cone.

This pressure means may preferably comprise a negative or low pressure tank, a positive or high pressure tank and a pump arranged to pump out of the first into the second, conduit means and the necessary valving being provided and arranged to direct positive pressure fluid to inflate the toroids and to direct negative pressure fluid to the space which is bounded by the toroids, the fighter nose skin, and the tanker cone. Properly inflated toroids will absorb the energy required to stop the fighter when the fighter nose extension has entered to an approximate limit in the tanker cone. The pressure difference between the inside of the tanker cone and the atmosphere provides a resultant forward force on the fighter nose to hold it in the tanker cone. The difference in cross sectional area of the fighter nose extension at the outer and inner rings multiplied by the differential pressure gives a resultant forward thrust sufficient to overcome the drag of the fighter and hold it in a position fixed relative to the tanker while the refuelling operation is being carried out. The fighter pilot may release his plane from the tanker by opening a vent in the fighter skin, the pilot being provided with means to control the vent. A similar vent and its control means in the tanker cone permits the tanker pilot to release the fighter, or the fighter may release himself by cutting throttle and extending dive brakes. Friction between the rubber toroids and the fighter nose extension helps keep the fighter connected to the tanker.

A conical formation of converging rubber bumper strips are secured to the inside of the tanker cone to assist in guiding the fighter to its fully entered position.

A fuel valve supported in the upper wall of the tanker cone has an operable portion which normally projects through into the space which the fighter nose extension occupies when the two aircrafts are connected, said operable portion being forced upwardly to open the fuel valve whenever the fighter nose extension is driven home to its fully entered position.

The operable portion of the fuel valve, which is forced radially outward to open position by entry of the fighter nose extension into the tanker cone, carries a rubber ring seal which seals off a considerable area of the fighter nose when the fighter nose is fully entered. The operable part of the fuel valve and a fitting on the fighter nose extension are both in communication with the sealed off area whereby, when the fighter nose extension is fully entered, the fighter is in flow communication with the tanker. A check valve and a hinged valve respectively control inflow and outflow of the sealed-off area. Upon withdrawal of the fighter nose extension, the check valve arrests flow from the fuel supply tank, and the hinged valve prevents spillage from the fighter tank.

These and other objects will become more apparent when read in the light of the accompanying specification and drawing wherein the drawing is to be interpreted as illustrative of my invention and not as a limitation thereof, however reference is made to the appended claims for the scope of my invention and wherein:

Fig. 1 is a cross-sectioal view showing how the nose of the fighter engages the socket of a tanker for refueling.

Fig. 2 is a cross-sectional view of the main fuel valve of the preferred embodiment of the invention.

Fig. 3 is a cross-sectional view of a modified form of the main view valve.

Fig. 4 is a view showing how the pilot can nose his fighter into the tanker cone.

Referring now to the drawings, a sheet metal cylinder 10 is anchored in the tail of the aircraft which is to serve as the tanker for carrying the supply of fuel.

Concentrically supported on the inside of the cylinder 10 by bracing members 12, 14, and 16 is the hollow cone into which the nose of the fighter projects when flow contact is made. The core assembly is broadly designated by the numeral 18.

The tanker cone 18 comprises a mid-section 20 in the form of a hollow truncated cone to the inner end of which is secured a toroid supporting member 22 and to the outer end of which is secured a toroid supporting member 24.

Member 22 is open on its inner surface so as to admit a hollow rubber toroid 26 when the toroid is deflated, while member 24 is similarly open to admit the hollow rubber toroid 30. Toroids 26 and 30 normally project into the cone boundary, as shown by dotted lines 26a and 30a when the toroids are partially inflated.

Rubber bumper strips 32 are circumferentially spaced apart on the inside of the tanker cone (see Fig. 4) and cover the midsection of the receptacle which extends from the member 22 to the member 24. The exemplification shown in the drawing consists of an aircraft with axial intake in contact with a refueling unit 18 installed in the tail of the craft. The airscoops 25 in the sides of the tanker craft are under the elevator and provide intake air for the axial intake type of fighter and also reduce the drag of the blunt tail profile of the tanker. The mass flow handled by this duct system should be designed to fit the mass flow requirement of the flighter jet engine or the tanker drag, whichever requirement is greater. A frusto-conic rubber membrane 27 joins the airscoops to the cone 18.

A pump 34 pumps air from the low pressure tank 36 into the high pressure tank 38 from whence it may be directed via valve 40 and pipes 42 and 44 into toroids 26 and 30 respectively to inflate them.

Air may be withdrawn by pump 34 via valve 46 and pipe 48 from the space 49 between and around the rubber bumper strips 32, whereby, when the fighter nose extension 50 is fully entered into the cone 18, the negative pressure in space 49 plus the friction between receptacle 18 and fighter nose 50 will firmly hold the fighter in place. The tanker pilot may release the fighter by closing the valve 46 and opening a valve 52, whereby the suction in pipe 48 is broken, or, the fighter pilot may release his plane by cutting his throttle and applying dive brakes.

Valve 40 which controls inflation of the toroids 26 and 30 and valve 46 which effects deflation of the space 49 between and around the bumper strips 32, are electrically operated from an electric power source 54 upon closing of an electric switch 56 by rod 57 actuated by movement of the fighter nose extension 50 into final position in the cone 18.

A pipe 58 brings fuel from the tanker's supply tanks (not shown) to the main fuel valve 60. Valve 60 is opened automatically when the fighter nose extension 50 is driven all the way to home position in the tanker. A fitting 62 on the inside of the fighter nose extension wedges in under the valve 60 and forces it upward to open position, thereby sealing off an area on the upper side of the fighter nose extension 50 which is in flow communication with the underside of the valve 60 (see enlarged Figs. 2 and 3).

The valve 60, shown to an enlarged scale in Fig. 2 comprises a stationary tubular member 64 attached to the lower end of fuel supply pipe 58 and having a shoulder 66 against which a spring 68 bears. The lower end of tubular member 64 is closed except for openings 70 through which fuel may flow when the small poppet 72 is raised off its seat 73 as shown as the fitting 62 of the fighter nose 50 wedges under the lower side of the valve 60.

The vertically movable member 74 of the valve 60 at its lower end carries a piston-like part 76 which is vertically slidable in the casing 78. Casing 78 has a flange 80 at its lower end by which it is joined to the wall of the cone 18. Circular rows of flow openings 82 and 84 provide flow passage into the space 86 of the fitting 62 and through the spring closed one-way valve 88. Seal rings 90, 92 and 94 are provided to prevent leakage between the several movable parts. The outflow end 96 of the fighter fitting 62 may be permanently connected to the fighter tanks by suitable piping or hose.

A modification of the fuel valve 60, Fig. 2, is shown at 98, Fig. 3 wherein most of the parts and their mode of operation are the same as described with respect to the valve 60, Fig. 2, except that, in the exemplification 98, Fig. 3, the small poppet 100 is stationary and its seat 102 is raised off the poppet, whereas in the exemplification 60, Fig. 2, the seat 73 is stationary and the poppet 72 is raised off the seat.

The operation of the invention herein disclosed is as follows:

With the toroids 26 and 30 in the tanker cone 18 partly inflated, the tanker pilot sets a straight course. The fighter pilot then approaches from the rear by the least turbulent path to a point at which he is flying a tight formation position in trail of the tanker. He may use either dive brakes or throttle for thrust control. With visual reference to the outer ring and centering his gunsight reticle on the airwing point, the fighter pilot noses into the tanker cone 18 past the outer toroid 30 guided by the converging rubber bumpers 32 and into the inner toroid 18. The rubber toroids absorb the energy necessary to stop the fighter nose extension 50 at an approximate preselected position in the tanker cone 18.

At this position the rod 57 will have closed the switch 56 whereby the pump 34 will have further inflated the toroids 26 and 30 and additionally deflated the space 49.

Coincidentally with the driving of the fighter nose extension 50 to final position in the tanker cone 18, the fitting 62 which is fast on the fighter nose extension 50 wedges in under the movable member 76 of the valve 60 thereby opening a flow passageway from the fuel supply pipe 58 through member 64, holes 70, 82, 84 into fitting 86, valve 88, pipe 96 into the fighter tanks. Thus the mere act of coupling together the fighter and tanker opens a flow passage from the tanker to the fighter while the act of separating one from the other closes against outflow from either tank.

We claim:

1. Apparatus for in-flight refueling of a fighter by a tanker which comprises a supporting structure secured to the inner wall of the tanker fuselage, a frusto-conical socket structure which consists of a mid-section in the form of a hollow truncated cone with an annular seal support of channel shaped cross section at each end of the mid-section, the open side of the channel being inward, an inflatable toroid of rubber material in each channel, the toroids, when inflated projecting inward through the said open side into the cone boundary, a fuel valve secured in and projecting inward through the wall of said mid-section, a member of said valve being movable radially outward to open said valve, a fighter nose extension of the same external contour but slightly smaller diameter than the inside of the socket structure, thereby leaving an annular space between the interior of the conical socket and the fighter nose extension, when fully inserted, for the length of the mid-section, means to create a negative pressure in said space and inflate said toroids, a series of bumper strips circumferentially spaced around the inside of the tanker cone and fastened thereto thereby converging toward the small end thereof, a fitting carried in said nose extension, positioned to stop under said fuel valve when said fighter nose extension is fully inserted and raise said valve member to open said valve, seal means to seal off an area between said valve and said fitting, and a one-way valve in said fitting adapted for fuel flow through said fitting into said fighter.

2. Apparatus for in-flight refueling of a fighter by a tanker which comprises a frusto-conical socket structure fixedly carried in the fuselage of the tanker and comprising a mid-section in the form of a hollow truncated cone with an annular seal support at each end of the mid-section each open around its inner circumference, a flexible inflatable toroid seal of rubber material in each annular seal support, the toroids, when inflated, projecting inwardly into the cone boundary, a fuel valve extending through the wall of said mid-section, a part of said valve being movable outward to open position, a fighter nose extension of the same external contour but of slightly smaller diameter than the inside of the socket structure, thereby leaving a space between the interior of the conical socket and the fighter nose extension, means to create a negative pressure in said space and inflate said toroids, bumper means of rubber material around the inner wall of the mid-section and fastened thereto, a fitting carried in said nose extension positioned to stop under said fuel valve when said fighter nose extension is fully inserted to raise said valve part to open said valve, means to seal off an area between said valve and said fitting, and a one-way valve in said fitting adapted for fuel flow into said fighter.

3. Apparatus for refueling one aircraft by another in flight, which comprises an inwardly tapering hollow socket on one aircraft and a hollow plug of corresponding taper on the other aircraft, seal rings, one at each end of the hollow socket, each projecting slightly into the socket boundary whereby a slight annular space is left between the plug and socket, means to evacuate said space, an inflow fuel valve in the side of the hollow socket, an outflow fuel valve in the side of the hollow plug, said inflow and outflow valves being aligned and joined when said plug is fully inserted, and means to seal off an area around said openings from said space.

4. Apparatus for refueling one aircraft by another in flight which comprises a plug in one aircraft, a socket in the other, an annular seal fixed in the socket at each end between the plug and socket when the plug is fully entered, providing a slight space between the socket and plug intermediate the annular seals, means to evacuate said space, and complementary fuel openings in the wall of the plug and socket which become aligned for passage of fuel when said plug is fully entered.

5. The apparatus of claim 4 wherein the said seals are inflatable toroids.

6. The apparatus of claim 5 with means to inflate said toroids.

7. Apparatus for transferring a liquid from one aircraft to another in flight which comprises a plug member on one aircraft, a socket member on the other aircraft, a pair of annular inflatable spaced seals fixed on one of the said members adjacent the opposite ends thereof closely fitting the other of said members when the two members are fully engaged, the plug, when fully entered being slightly smaller than the socket, thereby leaving a small annular space between said members extending between said spaced annular inflatable seals, and means to evacuate said space and inflate said seals, said plug and said socket having cooperating liquid communicating passages therein located for registration between the inflated seals when the plug member is fully inserted in said socket.

8. The device of claim 7 in which the seals are inflatable toroids, and means to inflate said toroids.

9. Apparatus for in-flight refueling of a fighter by a tanker which comprises a frusto-conical socket structure fixedly carried in the fuselage of the tanker and comprising a mid-section in the form of a hollow truncated cone with an annular seal support at each end of the mid-section each open around its inner circumference, a flexible, inflatable toroid seal of rubber material in each annular seal support, the toroids, when inflated, projecting inwardly into the cone boundary, a fuel valve extending through the wall of said mid-section, a part of said valve being movable outward to open position, a fighter nose extension of the same external contour but of slightly smaller diameter than the inside of the socket structure, thereby leaving a space between the interior of the conical socket and the fighter nose extension, means to create a negative pressure in said space and inflate said toroids, bumper means of rubber material around the inner wall of the mid-section and fastened thereto, a fitting carried in said nose extension positioned to stop under said fuel valve when said fighter nose extension is fully inserted to raise said valve part to open said valve, means to seal off an area between said valve and said fitting, and a one-way valve in said fitting adapted for fuel flow into said fighter, said means to deflate said space and inflate said toroids comprising a low pressure tank, a high pressure tank, a pump having its low side in communication with said low pressure tank and its high side in communication with said high pressure tank, piping for flow connecting the high pressure tank to said toroids and the low pressure tank to said space, and valve means to control flow through said piping.

10. Apparatus for in-flight refueling of a fighter by a tanker which comprises a frusto-conical socket structure fixedly carried in the fuselage of the tanker and comprising a mid-section in the form of a hollow truncated cone with an annular seal support at each end of the mid-section each open around its inner circumference, a flexible, inflatable toroid seal of rubber material in each annular seal support, the toroids, when inflated, projecting inwardly into the cone boundary, a fuel valve extending through the wall of said mid-section, a part of said valve being movable outward to open position, a fighter nose extension of the same external contour but of slightly smaller diameter than the inside of the socket structure, thereby leaving a space between the interior of the conical socket and the fighter nose extension, means to create a negative pressure in said space and inflate said toroids, bumper means of rubber material around the inner wall of the mid-section and fastened thereto, a fitting carried in said nose extension positioned to stop under said fuel valve when said fighter nose extension is fully inserted to raise said valve part to open said valve, means to seal off an area between said valve and said fitting, and a one-way valve in said fitting adapted for fuel flow into said fighter, said means to deflate said space and inflate said toroids comprising a low pressure tank, a high pressure tank, a pump having its low side in communication with said low pressure tank and its high side in communication with said high pressure tank, piping for flow connecting the high pressure tank to said toroids and the low pressure tank to said space, and valve means to control flow through said piping, said valve means being electrically operated, an electric power source for operating said valve means, and a switch for controlling the electric power operable by movement of the fighter nose extension to its fully inserted position.

References Cited in the file of this patent

UNITED STATES PATENTS

| | | |
|---|---|---|
| 1,728,034 | Bol | Sept. 10, 1929 |
| 2,166,575 | Atcherley | July 18, 1939 |
| 2,199,588 | Cobham et al. | May 7, 1940 |
| 2,582,609 | Steele | Jan. 15, 1952 |
| 2,596,455 | Williams et al. | May 13, 1952 |

FOREIGN PATENTS

| | | |
|---|---|---|
| 637,801 | Great Britain | May 24, 1950 |